United States Patent [19]
Yagyu

[11] Patent Number: 5,822,161
[45] Date of Patent: Oct. 13, 1998

[54] THIN FILM MAGNETIC HEAD

[75] Inventor: Shingo Yagyu, Yokosuka, Japan

[73] Assignee: Victor Company of Japan, Ltd., Yokohama, Japan

[21] Appl. No.: 755,696

[22] Filed: Nov. 25, 1996

[30] Foreign Application Priority Data

Nov. 30, 1995 [JP] Japan ..................................... 7-338009

[51] Int. Cl.⁶ ..................................................... G11B 5/02
[52] U.S. Cl. ............................................................ 360/126
[58] Field of Search ...................................... 360/126, 122

[56] References Cited

U.S. PATENT DOCUMENTS 5,136,447  8/1992  Makino et al. ........................... 360/126

FOREIGN PATENT DOCUMENTS 3-58308  3/1991  Japan .

Primary Examiner—Robert S. Tupper
Attorney, Agent, or Firm—Michael N. Meller

[57] ABSTRACT

A thin film magnetic head 10 is comprised of a lower core 1b, a magnetic gap 2, a coil 4, an upper core 1a, a protective substrate 6, a first inorganic insulation film 3 and a substrate 7 on which the lower core, the magnetic gap, the coil, and the upper core are provided. The protective substrate is welded to the substrate by using a welding glass 5. A second inorganic insulation film 3b is additionally provided on the substrate so that the substrate is sandwitched between the first and second inorganic insulation films to prevent the substrate from warping when heated for welding.

2 Claims, 4 Drawing Sheets

THIN FILM MAGNETIC HEAD

BACKGROUND OF THE INVENTION

1. Field of the Invention

The present invention relates to a thin film magnetic head and its production methods, in particular, it relates to an improvement of a manufacturing method which prevents cracking and/or peeling of a protective substrate in a glass welding process of the thin film magnetic head manufacturing.

2. Description of the Related Art

Conventionally, a thin film magnetic head is widely used as a magnetic head for a hard disc drive and other equipment because of its low inductance and wide frequency range.

Conventional thin film magnetic head will be described hereunder with reference to FIGS. 1 to 4 and 5(a) to 5(c).

FIG. 1 shows a plan view of a thin film magnetic head of the prior art.

FIG. 2 is a sectional view of the thin film magnetic head of the prior art taken along line 22—22 of FIG. 1.

FIG. 3 is a front view showing a core portion of the thin film magnetic head of the prior art.

In FIG. 3, there is shown a magnetic gap 2, an upper core 1a of a magnetic film material, a lower core 1b of a magnetic film material, and an insulation layer 3. A coil 4 is shown in FIGS. 1 and 2. A substrate 7 is shown in FIGS. 2 and 3. As shown in FIG. 3, the magnetic gap 2 is not at the center in the direction perpendicular to the magnetic gap 2 of the thin film magnetic head. Therefore, the magnetic gap 2 does not make a good contact with a magnetic recording medium, such as a video tape. As shown in FIG. 4 a protective substrate 6 is bonded to the substrate 7 for positioning the magnetic gap 2 almost at the center of the thin film magnetic head 20, which causes the thin film magnetic head 20 to make a good contact to the magnetic recording medium (not shown).

When the protective substrate 6 is laminated by an organic adhesive, a bonded part collects dropout particles of the magnetic recording medium (not shown) because the organic adhesive is exposed and it tends to collect such particles. Thus, such a thin film magnetic head cannot reproduce or record signals precisely because the bonded part is close to the magnetic gap 2.

Therefore, a use of inorganic glass is preferable for welding the protective substrate 6 or the substrate 7 because the inorganic glass does not collect particles. However, a heat treatment of more than 400° C. is required for the inorganic glass welding process.

On the other hand, a thin film magnetic head of the prior art utilizes a resin material for a coil insulation, which cannot withstand the high temperature in the inorganic glass welding process. It is disclosed in the Japanese Patent Laid-Open Publication 3-58308/1991 that a thin film magnetic head utilizing inorganic materials for its constituting elements withstands the high temperature in the inorganic glass welding process, and such a thin film magnetic head is suited for a VTR.

However, in actual inorganic glass welding process of a thin film magnetic head 20 utilizing the technologies disclosed in the above prior art, it is revealed that when the protective substrate 6 is welded to the substrate 7, a glass layer 5 adjacent to a layer 3 has cracked showing a tear mark 11.

The cause of the tear mark 11 of the glass layer 5 is analyzed as follows.

In the thin film magnetic head manufacturing process, a wafer (not shown) comprising the substrate 7 laminated with the insulation layer 3, is cut to several blocks of bar shape. Then the protective substrate 6 is welded on the top of the insulation layer 3. Each of the blocks having the protective substrate 6 welded is further cut to pieces of thin film magnetic heads.

The insulation layer 3 is an $SiO_2$ film deposited by a sputtering technology.

An insulation material such as glass, or celamic is utilized for the substrate 7. The substrate 7 is required to have a same thermal coefficient as that of a thin magnetic film 1 (shown in FIGS. 1 and 2) in order to have good magnetic characteristics.

Accordingly, the thermal expansion coefficient of the substrate 7 is selected to be 80 to $120 \times 10^{-7}$, which corresponds to that of magnetic materials such as permalloy (trade name), sendust (trade name), magnetic amorphous, and iron nitride.

On the other hand, the thermal expansion coefficient of $SiO_2$ is 5 to $10 \times 10^{-7}$.

A thickness of the deposited insulation layer 3 is approximately 30 to 40 μm. The insulation layer 3 undergoes a compressive stress of 1 to $3 \times 10^9$ dyne/cm² in the sputtering process. As a result, the substrate 7 is bent as shown in FIG. 5(A).

Thereafter, when heat is applied to the protective substrate 6 and the substrate 7 for welding them together, a ruminated body of the protective substrate 6 and the substrate 7 tend to bend as shown in FIG. 5(B) because of the thermal expansion coefficient difference between the two. In practice, the protective substrate 6 and the substrate 7 are secured in a jig (not shown) for keeping their flatness by compressing them in the direction of vertical arrows in FIG. 5(B).

After the welding process, the temperature is brought down to a room temperature. Then, the laminated body regains the compressive stress and is biased as shown by a bent arrow in FIG. 5(C). Accordingly, the glass layer 5 is liable to crack due to a separating force generated between the insulation layer 3 and the protective substrate 6 as shown by bidirectional arrows in FIG. 5(C).

SUMMARY OF THE INVENTION

Accordingly, a general object of the present invention is to provide a novel and useful thin film magnetic head in which the above disadvantage is eliminated.

Another object of the present invention is to provide a novel and useful manufacturing process of the thin film magnetic head.

Further and another object of the present invention is to provide a novel and useful process in which a stress to a substrate of the thin film magnetic head is compensated.

A specific object of the present invention is to provide a thin film magnetic head comprising a first substrate, a lower core provided on the first substrate, an upper core provided over the lower core, a magnetic gap provided between the lower core and the upper core, a first inorganic film provided on one side of the first substrate, a second inorganic film provided on another side of the first substrate, a coil provided partly between the lower core and the upper core for detecting a signal induced therein, and a glass layer provided over the second inorganic film for welding a second substrate thereon, so that the first substrate carrying the lower core, the magnetic gap, the coil, and the upper core, is interposed between the first and second inorganic films, and laminated to the second substrate with the second inorganic film and the glass layer being interfaced.

DETAILED DESCRIPTION OF THE PREFERRED EMBODIMENTS

Figure 1:
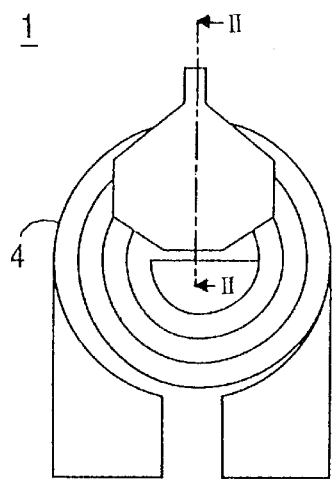
FIG. 1 shows a plan view of a thin film magnetic head of a prior art.
Figure 2:
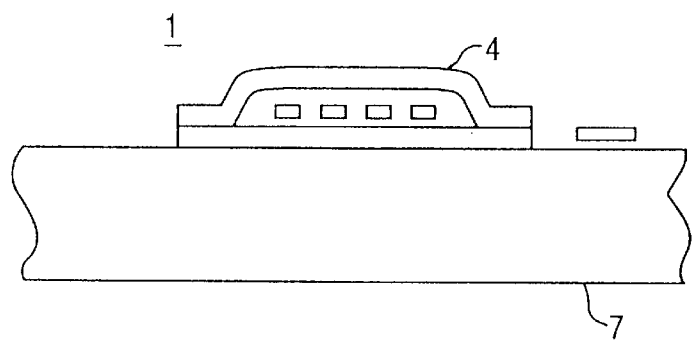
FIG. 2 is a sectional view of the thin film magnetic head of the prior art taken along line II—II of FIG. 1.
Figure 3:
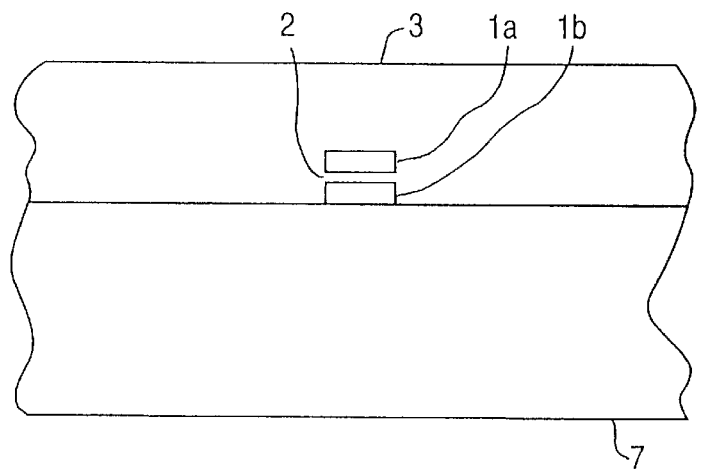
FIG. 3 is a front view showing a core portion of the thin film magnetic head of the prior art.
Figure 5A:
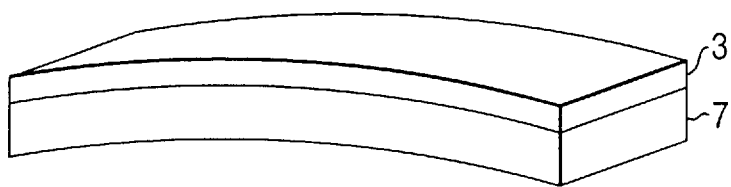
FIGS. 5(A) through 5(C) are perspective views of a manufacturing process of the thin film magnetic head of the prior art.
Figure 5B:
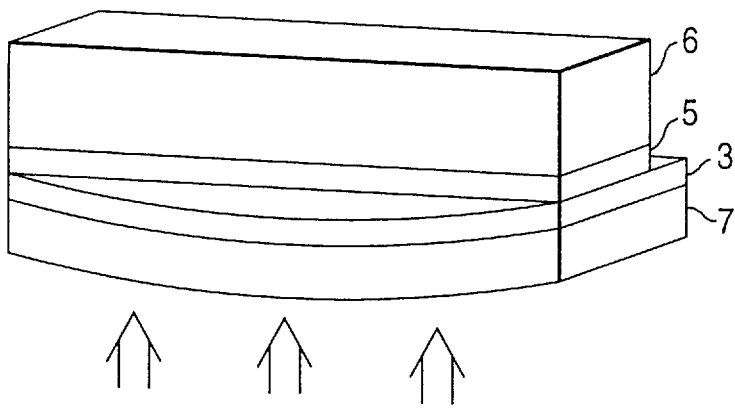
Figure 5C:
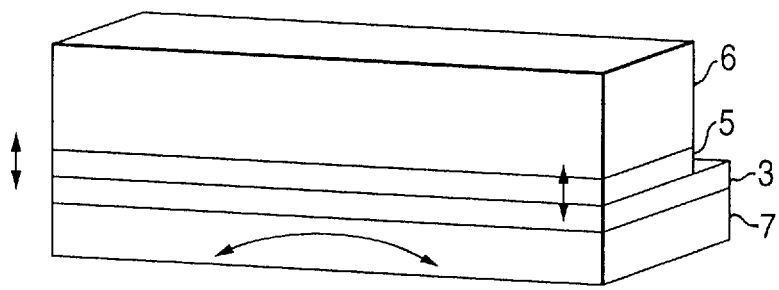

The present invention will now be described in detail with reference to the accompanying drawings, in which same reference numerals and symbols are used to denote like or equivalent elements used in the aforementioned prior arts, and detailed explanation of such elements are omitted for simplicity.

According to the present invention, an additional inorganic film is provided to a substrate so as to cancel a thermal stress caused in a heating process of a thin film magnetic head manufacturing.

Figure 6:
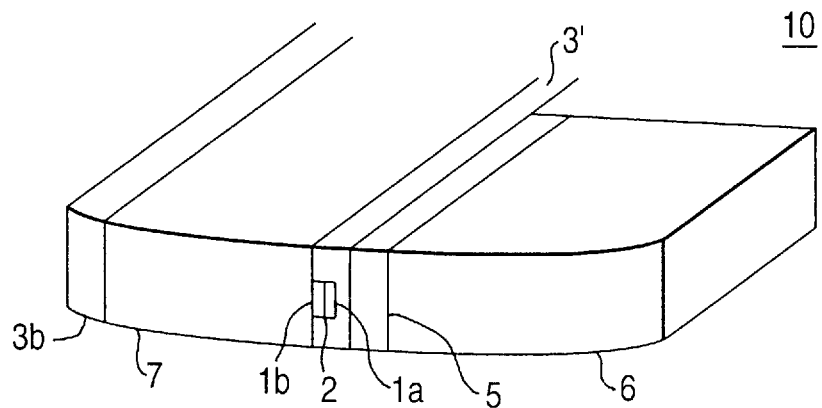
FIG. 6 shows a perspective view of a thin film magnetic head of the present invention.
Figure 4:
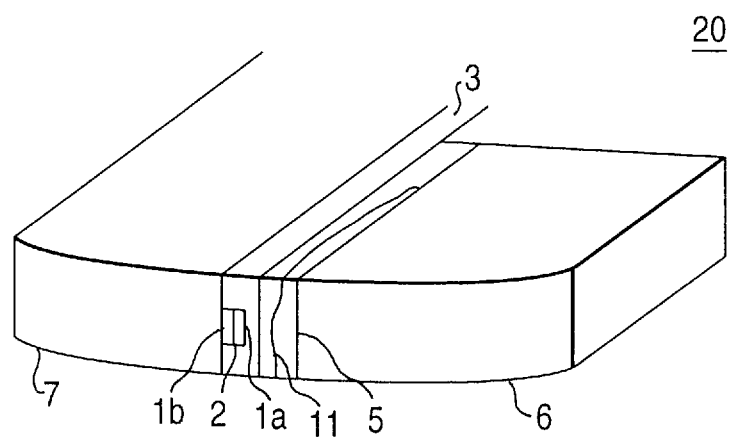
FIG. 4 shows a perspective view of the thin film magnetic head of the prior art.

FIG. 6 shows a perspective view of a thin film magnetic head of the present invention.

FIGS. 7(A) through 7(D) are perspective views of a manufacturing process of the thin film magnetic head of the present invention.

Figure 7A:
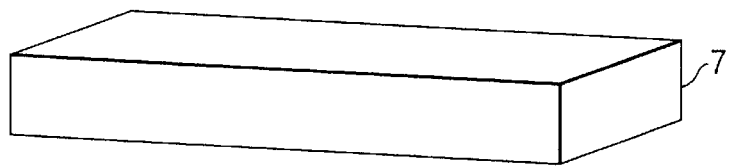
FIGS. 7(A) through 7(D) are perspective views of a manufacturing process of the thin film magnetic head of the present invention.
Figure 7B:
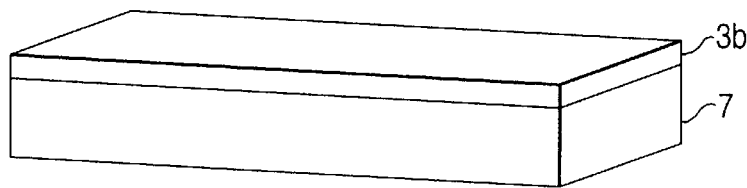
Figure 7C:
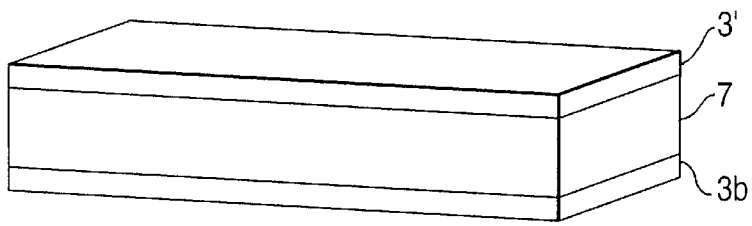
Figure 7D:
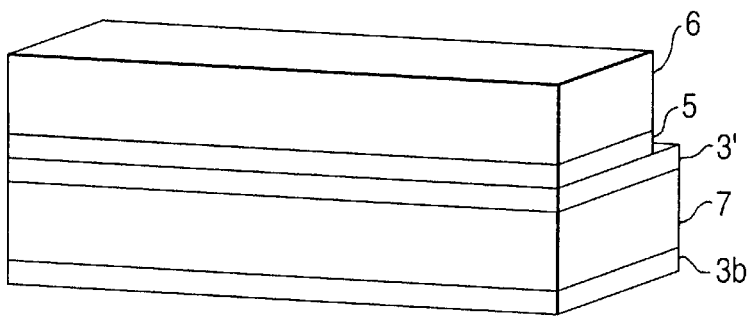

A thin film magnetic head 10 is comprised of a lower core 1b, a magnetic gap 2, a coil (not shown), an upper core 1a, a first inorganic film 3' for insulation, all of them are provided on a substrate 7 (FIG. 6), and of a protective substrate 6 welded on the inorganic film 3 by utilizing a glass layer 5 for welding, and a second inorganic film 3b provided on another side of the substrate 7 (FIGS. 6 and 7(D)). The thickness and the thermal expansion coefficient of the second inorganic film 3b are same as those of the first inorganic film 3'. Both the first and second inorganic films 3' and 3b are electrically insulative.

An embodiment of the present invention will now be explained by referring to FIGS. 6 through 7(D).

In the first manufacturing process, facing a depositing surface upward, the lower core 1b of a magnetic material, the magnetic gap 2 provided between the lower core 1b and the upper core 1a, the coil 4 provided partly between the lower core 1b and the upper core 1a for detecting a signal induced by a magnetic medium, and the upper core 1a of a magnetic material are formed on the substrate 7 in this order, then a wafer carrying those formed elements is sliced to a block as shown in FIG. 7(A). As a result, each block contains few head assemblies of above elements.

In the second process, the second inorganic film 3b, such as SiO$_2$ or equivalent material, having 20–30 μm of thickness, is deposited at a room temperature, on a back surface, opposite to the surface having the formed elements, of the substrate 7 by a vacuum deposition such as sputtering (FIG. (7B)).

In the third process, the sliced block in the first manufacturing process is turned upside-down so that the second inorganic film 3b faces downward. Then the first inorganic film 3', such as SiO$_2$ or equivalent material, having 20–30 μm of thickness, is deposited at a room temperature, on an exposed top face of the substrate 7, where the preliminary formed head elements are provided by a vacuum deposition such as sputtering (FIG. 7(C)). Material of the first inorganic glass 3' is the same in material as the second inorganic film 3b, or at least its thermal expansion coefficient is the same as that of the second inorganic film 3b.

In the fourth process, the inorganic glass layer 5 for welding, such as lead glass is deposited at a room temperature on the protective substrate 6 up to ten to several tens μm thick. This deposition is performed independently from the first to third manufacturing processes. Then the protective substrate 6 having the inorganic glass layer 5 and the substrate 7 are stacked up togetherwith the first inorganic film 3' and the glass layer 5 being interposed.

The protective substrate 6 is provided to make the thin film magnetic head 10 to be symmetric with respect to the magnetic gap 2.

A material for the protective substrate 6, is selected to be the same as that of the substrate 7, or to have the same thermal expansion coefficient as that of the substrate 7.

A lead glass is chosen for the glass layer 5, which has the same or a nearly equal value of the thermal expansion coefficient of the first inorganic film 3'.

The stacked up protective substrate 6 and the substrate 7 are heated up to more than 400° C. for welding.

A material for the substrate 7 is such as glass, and celamics. The material should have almost the same thermal expansion coefficient as that of the thin magnetic film 1 (FIG. 1). Accordingly, the thermal expansion coefficient of the substrate is preferred to be 80 to 120×10$^{-7}$, which corresponds to that of a magnetic material such as permalloy (trade name), sendust (trade name), magnetic amorphous, and iron nitride.

On the other hand, the thermal expansion coefficient of SiO$_2$ is 5 to 10×10$^{-7}$.

The substrate 7 is now sandwitched between the first and second inorganic films 3' and 3b having almost the same thickness.

As a result, no tension is developed in the first inorganic film 3', which strains otherwise the glass layer 5 interfacing the first inorganic films 3' as shown in FIG. 7(D).

As shown in the above, the thin film magnetic head 10 shown in FIG. 6 has a tight welding construction of the glass layer 5 without developing crack, or peeling.

The thin film magnetic head 10 of the present invention is comprised of the protective substrate 6, the glass layer 5, the first inorganic film 3, the upper core 1a, the magnetic gap 2, the lower core 1b, the substrate 7, and the second inorganic film 3b for stress compensating.

The advantage of the present invention is to prevent generation of the stress due to the thermal expansion caused by the differences of the thermal expansion coefficients between the first inorganic film 3' and the substrate 7.

Another advantage of the present invention is to prevent cracking or peeling of the glass layer 5 by preventing the stress, which is achieved by providing the second inorganic film 3b, and by welding the protective substrate 6 on the first inorganic film 3'.

What is claimed is:

1. A thin film magnetic head comprising:

a first substrate;

a lower core provided on said first substrate;

an upper core provided over said lower core;

a magnetic gap provided between said lower core and said first substrate;

a first inorganic film (3b) provided on one side of said first substrate;

a second inorganic film (3') provided on another side of said first substrate;

a coil provided partly between said lower core and said upper core for detecting a signal included therein;

a glass layer provided over said second inorganic film for welding a second substrate thereon, so that said first substrate carrying the lower core, the magnetic gaps, the coil, and the upper core, is interposed between said first and second inorganic films, and laminated to said second substrate with said second inorganic film and said glass layer being interfaced with each other; and said first and second inorganic films having substantially the same thickness and thermal expansion coefficient.

2. A thin film magnetic head as claimed in claim 1, in which said first inorganic film is electrically insulative.

* * * * *